US012663843B2

(12) United States Patent
Kim

(10) Patent No.: US 12,663,843 B2
(45) Date of Patent: Jun. 23, 2026

(54) MEMORY DEVICE HAVING A SUPPORT STRUCTURE

(71) Applicant: SK hynix Inc., Icheon-si (KR)

(72) Inventor: Jae Ho Kim, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 354 days.

(21) Appl. No.: 18/489,705

(22) Filed: Oct. 18, 2023

(65) Prior Publication Data

US 2024/0377865 A1 Nov. 14, 2024

(30) Foreign Application Priority Data

May 11, 2023 (KR) ........................ 10-2023-0060826

(51) Int. Cl.
G06F 1/183 (2026.01)

(52) U.S. Cl.
CPC .................................... G06F 1/183 (2013.01)

(58) Field of Classification Search
CPC ......... G06F 1/183; H10B 43/20; H10B 43/35; H10B 43/50; H10B 43/10; H10B 43/27
See application file for complete search history.

(56) References Cited

U.S. PATENT DOCUMENTS 11,398,491 B2 * 7/2022 Baek ...................... H10B 43/10
12,512,130 B2 * 12/2025 Kim ....................... G11C 5/025

| 2016/0204123 | A1 | 7/2016 | Yang et al. | |
| 2021/0249441 | A1* | 8/2021 | Lee ........................ | H10B 41/10 |
| 2023/0084615 | A1 | 3/2023 | Xie et al. | |
| 2024/0324212 | A1 | 9/2024 | Kitamoto | |
| 2024/0357809 | A1 | 10/2024 | Aung et al. | |
| 2024/0377865 | A1 | 11/2024 | Kim | |

FOREIGN PATENT DOCUMENTS

| CN | 115312528 | A | 11/2022 |
| KR | 100492899 | B1 | 6/2005 |
| KR | 1020200011852 | A | 2/2020 |
| KR | 1020200020332 | A | 2/2020 |
| KR | 1020220059122 | A | 5/2022 |
| WO | 2022231674 | A1 | 11/2022 |

* cited by examiner

*Primary Examiner* — Allison Bernstein
(74) *Attorney, Agent, or Firm* — WILLIAM PARK & ASSOCIATES LTD.

(57) ABSTRACT

A memory device includes a first outer support structure extending along a first direction. The memory device also includes a first protrusion pattern extending along the first direction, the first protrusion pattern being in contact with an end of the first outer support structure. The memory device further includes a connection support structure spaced apart from the first protrusion pattern along a second direction perpendicular to the first direction. The memory device additionally includes a first oblique support structure connecting the connection support structure and the first outer support structure to each other in an oblique direction to the first and second directions.

15 Claims, 14 Drawing Sheets

MEMORY DEVICE HAVING A SUPPORT STRUCTURE

CROSS-REFERENCE TO RELATED APPLICATION

The present application claims priority under 35 U.S.C. § 119 (a) to Korean patent application number 10-2023-0060826 filed on May 11, 2023, in the Korean Intellectual Property Office, the entire disclosure of which is incorporated by reference herein.

BACKGROUND

1. Technical Field

The present disclosure generally relates to a memory device having a support structure, and more particularly, to a memory device having a support structure located in a connection region.

2. Related Art

A memory device may include a memory cell array in which data is stored, a peripheral circuit configured to perform a program, read, or erase operation of the memory cell array, and a control circuit configured to control the peripheral circuit.

The memory cell array may include a plurality of memory blocks. When the memory blocks are formed in a three-dimensional structure, the memory blocks may be separated from each other by slit regions.

The memory blocks formed in the three-dimensional structure may include a stack structure in which memory cell are stacked in a vertical direction from a substrate. The stack structure may include a plurality of gate lines and a plurality of insulating layers, which are alternately stacked. When the memory blocks are configured with the stack structure, support structures may be used to prevent the stack structure from being bent or destroyed in a manufacturing process of the memory device. For example, the support structures may be located in a cell region or a connection region defined at both ends of the cell region.

As the degree of integration of the memory device increases, the size of support structures included in the cell region and the connection region decreases. Therefore, a bridge may occur, in which some support structures are in contact with each other. The bridge occurring between the support structures which are to be electrically blocked from each other is a defect in the memory device, and therefore, the yield of the manufacturing process of the memory device may be curtailed.

SUMMARY

An embodiment may provide a memory device capable of reducing a defect of the memory device.

In accordance with an embodiment of the present disclosure, a memory device may include: a first outer support structure extending along a first direction; a first protrusion pattern extending along the first direction, the first protrusion pattern being in contact with an end of the first outer support structure; a connection support structure spaced apart from the first protrusion pattern along a second direction perpendicular to the first direction; and a first oblique support structure connecting the connection support structure and the first outer support structure to each other in an oblique direction to the first and second directions.

In accordance with another embodiment of the present disclosure, a memory device may include: a first outer support structure extending in a first direction; a connection support structure spaced apart from the first outer support structure along a second direction perpendicular to the first direction; a first oblique support structure connecting the connection support structure and the first outer support structure to each other in an oblique direction to the first and second directions; and a first auxiliary support structure located in a region in which the first direction along the first outer support structure and the second direction along the connection support structure extend to intersect with each other, the first auxiliary support structure being spaced apart from the first outer support structure, the connection support structure, and the first oblique support structure.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be enabling to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

The specific structural and functional descriptions disclosed herein are merely illustrative for the purpose of describing embodiments according to the concept of the present disclosure. Additional embodiments according to the concept of the present disclosure can be implemented in various forms. Thus, the present disclosure should not be construed as limited to the embodiments set forth herein.

Hereinafter, it will be understood that, although the terms "first," "second," etc. may be used herein to describe various elements, these elements should not be limited by these terms. These terms are used only used to distinguish one element from another element and not to imply a number or order of elements.

Figure 1:
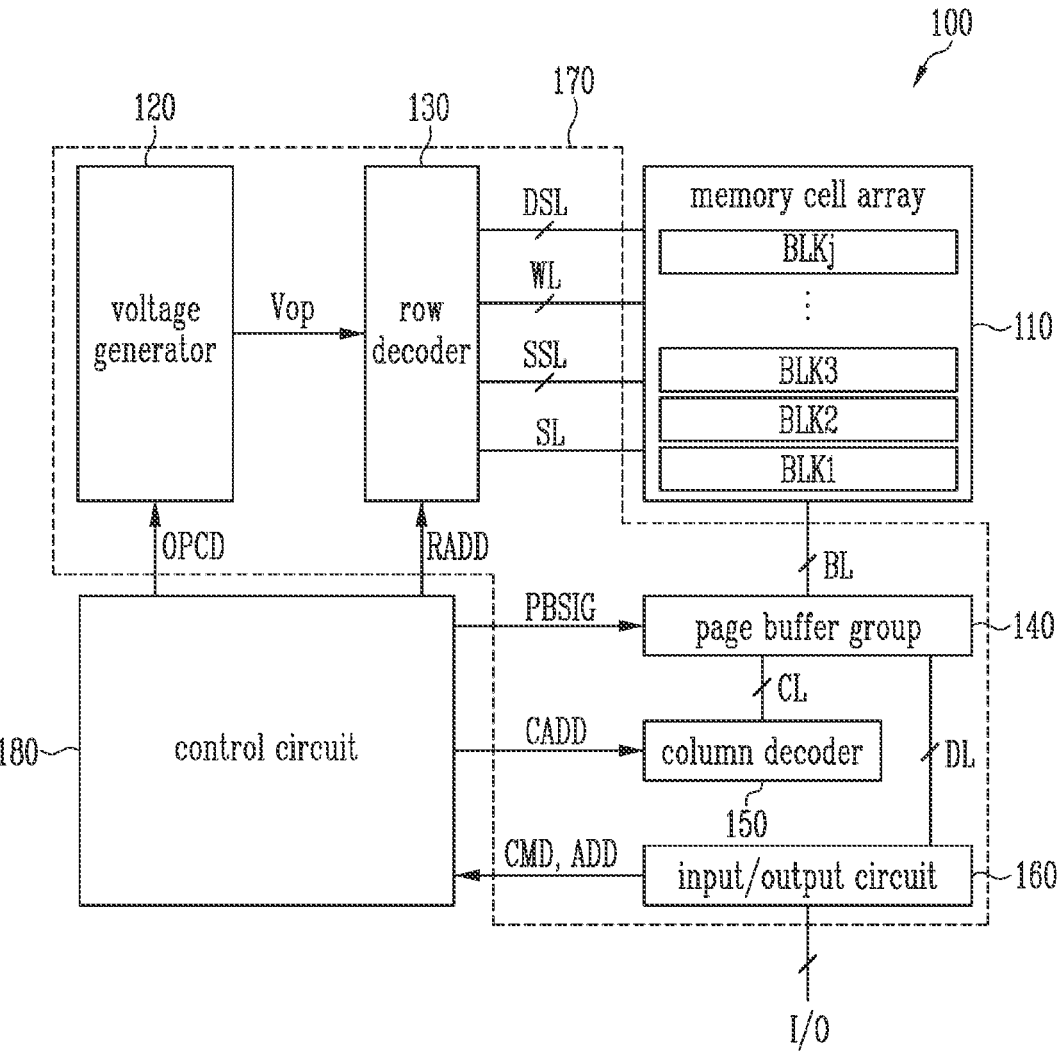
FIG. 1 is a diagram illustrating a memory device.

FIG. 1 is a diagram illustrating a memory device.

Referring to FIG. 1, the memory device 100 may include a memory cell array 110, a peripheral circuit 170, and a control circuit 180.

The memory cell array 110 may include first to jth memory blocks BLK1 to BLKj. Each of the first to jth memory blocks BLK1 to BLKj may include memory cells capable of storing data. Drain select lines DSL, word lines WL, source select lines SSL, and a source line may be connected to each of the first to jth memory blocks BLK1 to BLKj, and bit lines BL may be commonly connected to the first to jth memory blocks BLK1 to BLKj.

The first to jth memory blocks BLK1 to BLKj may be formed in a two-dimensional structure or a three-dimensional structure. Memory blocks having the two-dimensional structure may include memory cells arranged in parallel to a substrate. Memory blocks having the three-dimensional structure may include memory cells stacked in a vertical direction from a substrate. In this embodiment, memory blocks formed in a three-dimensional structure are disclosed.

The memory cells may store one-bit or two-or-more-bit data according to a program manner. For example, a manner in which one-bit data is stored in one memory cell is referred to as a single-level cell (SLC) manner, and a manner in which two-bit data is stored in one memory cells is referred to as a multi-level cell (MLC) manner. A manner in which three-bit data is stored in one memory cell is referred to as a triple-level cell (TLC) manner, and a manner in which four-bit data is stored in one memory cell is referred to as a quad-level cell (QLC) manner. In addition, five-or-more-bit data may be stored in one memory cell.

The peripheral circuit 170 may be configured to perform a program operation for storing data, a read operation for outputting data stored in the memory cell array 110, and an erase operation for erasing data stored in the memory cell array 110. For example, the peripheral circuit 170 may include a voltage generator 120, a row decoder 130, a page buffer group 140, a column decoder 150, and an input/output circuit 160.

The voltage generator 120 may generate various operating voltages Vop used for a program operation, a read operation, or an erase operation in response to an operation code OPCD. For example, the voltage generator 120 is configured to generate program voltages, turn-on voltages, turn-off voltages, negative voltages, precharge voltages, verify voltages, read voltages, pass voltages, and erase voltages in response to the operation code OPCD. The operating voltages Vop generated by the voltage generator 120 may be applied to drain select lines DSL, word lines WL, source select lines SSL, and a source line SL of a selected memory block through the row decoder 130.

The program voltages are voltages applied to a selected word line among word lines WL in a program operation, and may be used to increase a threshold voltage of memory cells connected to the selected word line. The turn-on voltages may be applied to the drain select lines DSL or the source select lines SSL, and be used to turn on drain select transistors or source select transistors. The turn-off voltages may be applied to the drain select lines DSL or the source select lines SSL, and be used to turn off the drain select transistors or the source select transistors. For example, the turn-off voltage may be set to 0V. The precharge voltages are voltages higher than 0V, and may be applied to the bit lines in a read operation. The verify voltages may be used in a verify operation for determining whether a threshold voltage of selected memory cells has been increased to a target level. The verify voltages may be set to various levels according to the target level, and be applied to a selected word line.

The read voltages may be applied to a selected word line in a read operation of selected memory cells. For example, the read voltages may be set to various levels according to a program manner of the selected memory cells. The pass voltages are voltages applied to unselected word lines among the word lines WL in a program or read operation, and may be used to turn on memory cells connected to the unselected word lines.

The erase voltages may be used in an erase operation for erasing memory cells included in a selected memory block, and be applied to the source line SL.

The row decoder 130 may be configured to transmit the operating voltages Vop to drain select lines DSL, word lines WL, source select lines SSL, and a source line SL, which are connected to a selected memory block, according to a row address RADD. For example, the row decoder 130 may be connected to the voltage generator 120 through global lines, and may be connected to the first to jth memory blocks BLK1 to BLKj through the drain select lines DSL, the word lines WL, the source select lines SSL, and the source line SL.

The page buffer group 140 may include page buffers (not shown) connected to each of the first to jth memory blocks BLK1 to BLKj. The page buffers (not shown) may be connected to the first to jth memory blocks BLK1 to BLKj respectively through the bit lines BL. In a read operation, the page buffers (not shown) may sense a current or a voltage of the bit lines BL, which varies according to threshold voltages of selected memory cells, and temporarily store sensed data, in response to page buffer control signals PBSIG.

The column decoder 150 may be configured to transmit data between the page buffer group 140 and the input/output circuit 160 in response to a column address CADD. For example, the column decoder 150 may be connected to the page buffer group 140 through column lines CL, and transmit enable signals through the column lines. The page buffers (not shown) included in the page buffer group 140 may receive or output data through data lines DL in response to the enable signals.

The input/output circuit 160 may be configured to receive or output a command CMD, an address ADD, or data through input/output lines I/O. For example, the input/output circuit 160 may transmit, to the control circuit 180, a command CMD and an address ADD, which are received from an external controller, through the input/output lines I/O, and transmit data received from the external controller to the page buffer group 140 through the input/output lines I/O. Alternatively, the input/output circuit 160 may output data transferred from the page buffer group 140 to the external controller through the input/output lines I/O.

The control circuit 180 may output an operation code OPCD, the row address RADD, the page buffer control signals PBSIG, and the column address CADD in response to the command CMD and the address ADD. For example, when the command CMD input to the control circuit 180 is a command corresponding to a program operation, the control circuit 180 may control the peripheral circuit 170 to perform a program operation of a memory block selected by the address ADD. When the command CMD input to the control circuit 180 is a command corresponding to a read operation, the control circuit 180 may control the peripheral circuit 170 to perform the read operation of the selected memory block and output read data. When the command CMD input to the control circuit 180 is a command corresponding to an erase operation, the control circuit 180 may control the peripheral circuit 170 to perform the erase operation of the selected memory block.

Figure 2:
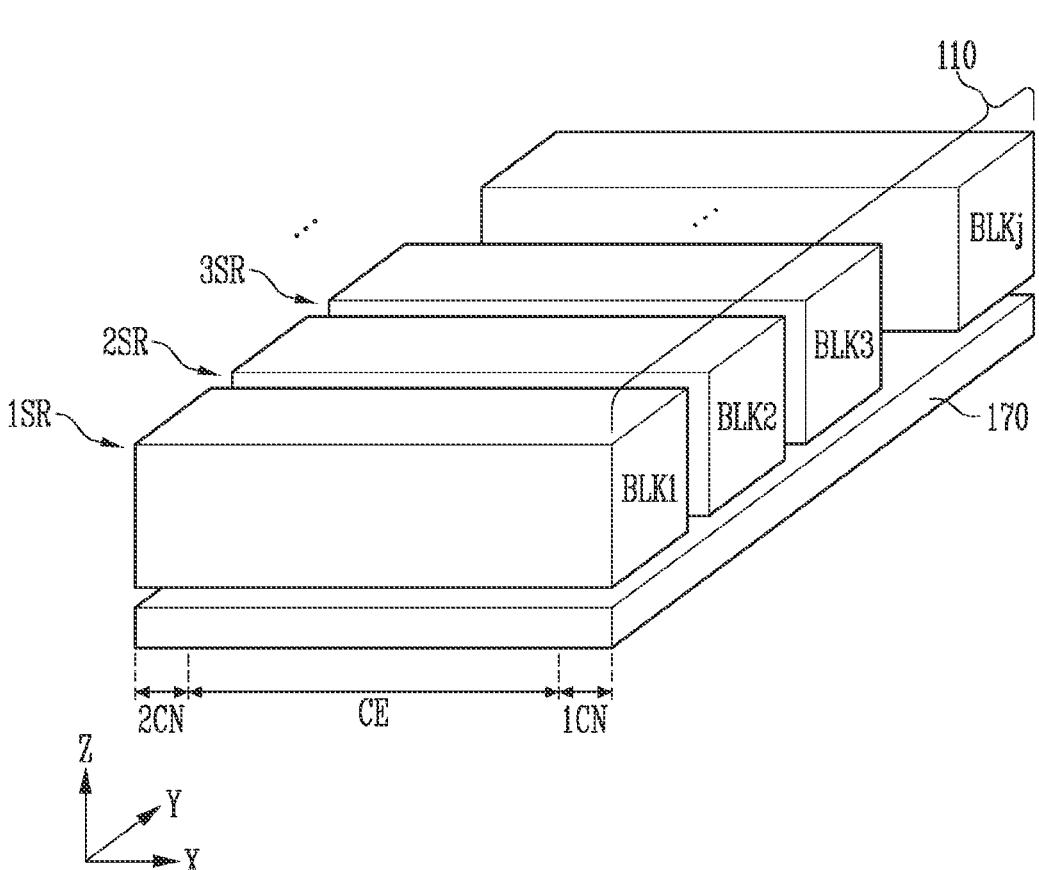
FIG. 2 is a diagram illustrating a memory cell array.

FIG. 2 is a diagram illustrating a memory cell array.

Referring to FIG. 2, the memory cell array 110 may be located on the peripheral circuit 170, but the positions of the memory cell array 110 and the peripheral circuit 170 are not limited to those shown in FIG. 2. For example, the memory cell array 110 may be located on the same plane as the peripheral circuit 170, and the memory cell array 110 and the peripheral circuit 170 may be in contact with each other after the memory cell array 110 and the peripheral circuit 170 are formed on different substrates.

The memory cell array 110 may include first to jth memory blocks BLK1 to BLKj. The first to jth memory blocks BLK1 to BLKj may be disposed to be spaced apart from each other along a Y direction. The first to jth memory blocks BLK1 to BLKj may be configured identically to one another, and be separated from each other by slit regions 1SR, 2SR, 3SR, . . . . Each of the slit regions 1SR, 2SR, 3SR, . . . may extend along an X direction. For example, the first memory block BLK1 may be located between a first slit region 1SR and a second slit region 2SR, and the second memory block BLK2 may be located between the second slit region 2SR and a third slit region 3SR. The first and second memory blocks BLK1 and BLK2 may be separated from each other by the second slit region 2SR.

The first to jth memory blocks BLK1 to BLKj may include a cell region CE and first and second connection regions 1CN and 2CN. The cell region CE may be located between the first and second connection regions 1CN and 2CN. Memory cells may be included in the cell region CE, and contacts and support structures may be included in the first and second connection regions 1CN and 2CN. The memory cells may be configured to store data, the contacts may be configured to be in contact with gate lines extending from the cell region CE or be in contact with the peripheral circuit 170 located under the memory blocks, and the support structures may be configured to support a stack structure located in the first and second connection regions 1CN and 2CN.

Figure 3A:
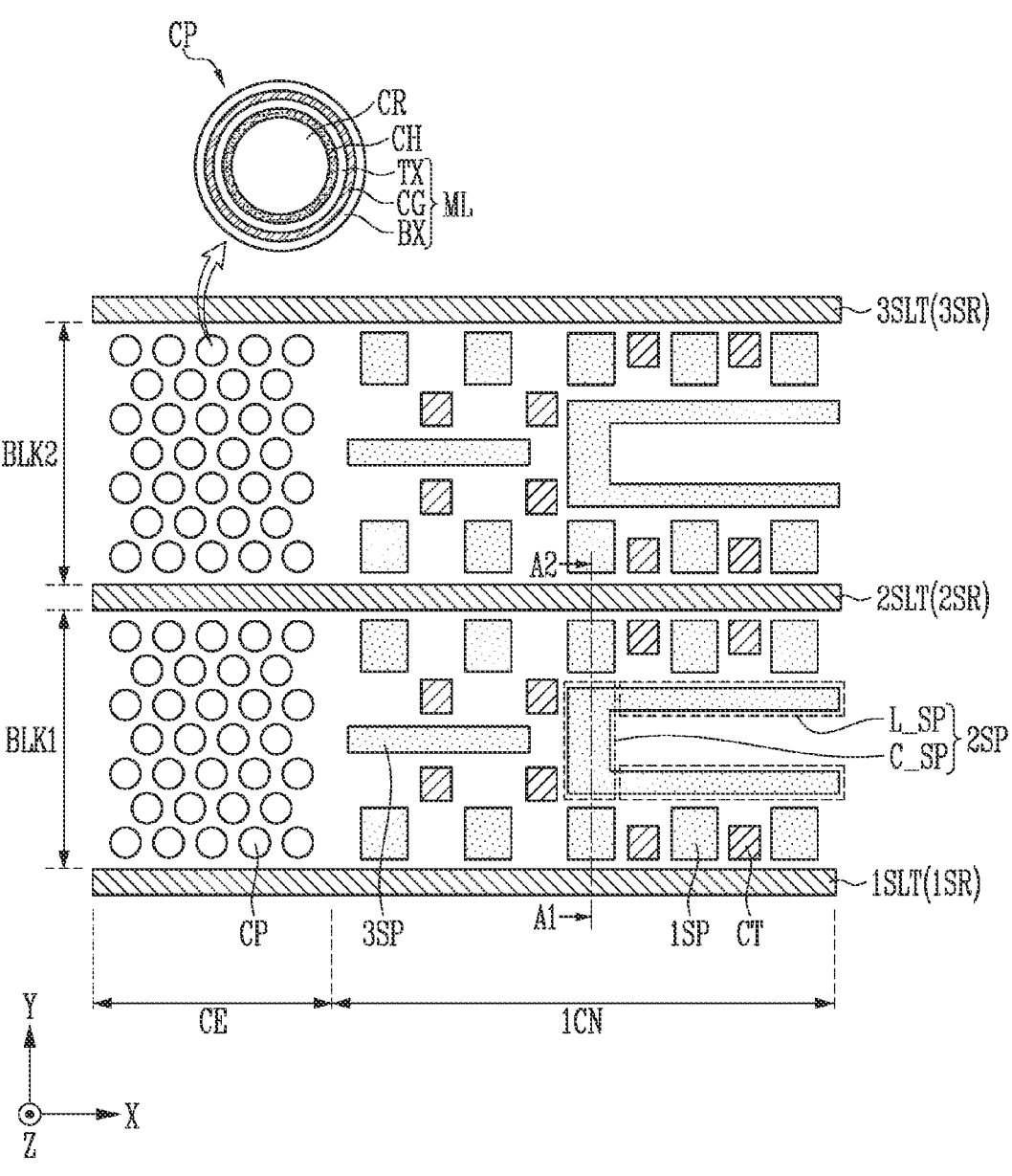
FIG. 3A is a view illustrating a structure of the memory device.

FIG. 3A is a view illustrating a structure of the memory device.

Referring to FIG. 3A, a layout of the first and second memory blocks BLK1 and BLK2 among the first to jth memory blocks BLK1 to BLKj shown in FIG. 2 is illustrated.

The first and second memory blocks BLK1 and BLK2 may be located between first to third slits 1SLT to 3SLT. The first to third slits 1SLT to 3SLT are structures formed in first to third slit regions 1SR to 3SR, and may be formed of an insulating material or a conductive material or be formed of the insulating material and the conductive material.

Each of the first and second memory blocks BLK1 and BLK2 may be divided into a cell region CE and a first connection region 1CN. Cell plugs CP including memory cells may be included in the cell region CE, and first support structures 1SP and second support structures 2SP, which are used to support the memory blocks and contacts which are electrically in contact with gate lines extending from the cell region CE or are electrically in contact with the peripheral circuit located under the memory blocks may be included in the first connection region 1CN.

Memory cells and select transistors may be included in each of the cell plugs CP. For example, a cell plug CP corresponding to the memory cells and the select transistors may include a core pillar CR, a channel layer CH, and a memory layer ML. The memory layer ML may include a tunnel insulating layer TX, a charge trap layer CG, and a blocking layer BX. The core pillar CR may have a cylindrical or circular pillar shape, and be formed of an insulating material or a conductive material. The channel layer CH may have a tubular shape surrounding a side surface of the core pillar CR, and be formed of poly-silicon. The tunnel insulating layer TX may have a tubular shape surrounding a side surface of the channel layer CH, and be formed of an oxide layer. The charge trap layer CG may have a tubular shape surrounding a side surface of the tunnel insulating layer TX, and be formed of a nitride layer. The blocking layer BX may have a tubular shape surrounding a side surface of the charge trap layer CG, and be formed of an oxide layer.

The first support structures 1SP located in the first connection region 1CN may be spaced apart from each other along the X direction in a region adjacent to the first to third slits 1SLT to 3SLT. The first support structures are adjacent to the first to third slits 1SLT to 3SLT, but are not in contact with the first to third slits 1SLT to 3SLT. The first support structures 1SP may penetrate a stack structure forming the memory blocks, and be formed of an insulating material. For example, first support structures 1SP included in the first memory block BLK1 may include support structures adjacent to the first slit 1SLT and support structures adjacent to the second slit 2SLT.

The second support structures 2SP may be located between the first support structures 1SP spaced apart from each other along the Y direction. Because the second support structures 2SP perform a function of separating the stack structure, the second support structures 2SP may include line support structures L_SP extending in the X direction and a central support structure C_SP extending along the Y direction from ends of the line support structures L_SP. The line support structures L_SP and the central support structure C_SP may be formed of an insulating material penetrating the stack structure. Insulating layers and sacrificial layers may be stacked in a stacked structure surrounded by the second support structure 2SP, and insulating layers and gate lines may be stacked in a stacked structure located at an outside of the second support structure 2SP.

The contacts CT may be located between the first support structures 1SP, and be formed of a conductive material.

A third support structure 3SP for supporting the stack structure may be further located in a region surrounded by the first support structures 1SP, the second support structure 2SP, and the cell region CE. The third support structure 3SP may have a line shape extending along the X direction, and be formed of an insulating material.

As shown in FIG. 3A, a portion at which each of the line support structures L_SP and the central support structure C_SP, which are included in the second support structure 2SP, meet each other forms a right angle. In addition, an area of the central support structure C_SP is wider than an area of each of the first support structures 1SP adjacent to the central support structure C_SP. Hence, bowing due to over-etching may occur at both ends of the central support structure C_SP in an etching process of forming a trench in a region in which the second support structure 2SP is to be formed.

Bowing, which may occur in the central support structure C_SP, will be described in detail as follows.

Figure 3B:
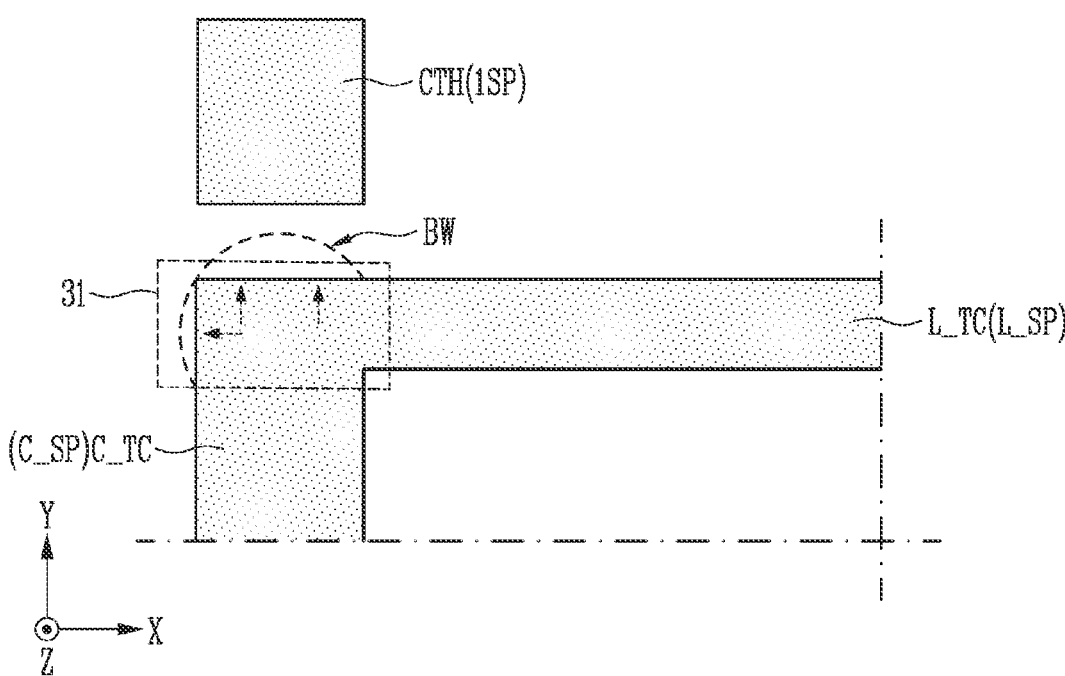
FIG. 3B is a view illustrating a phenomenon in which bowing occurs in a support structure.
Figure 3C:
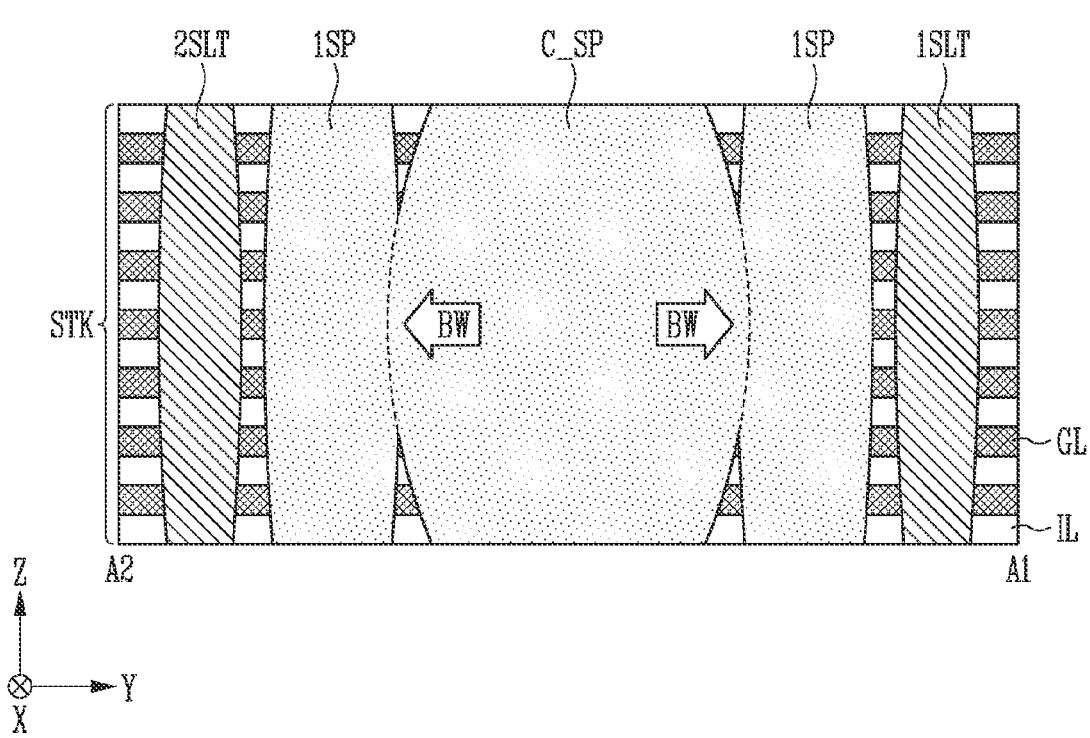
FIG. 3C is a view illustrating a defect due to bowing occurring in the support structure.

FIG. 3B is a view illustrating a phenomenon in which bowing occurs in a support structure. FIG. 3C is a view illustrating a defect due to bowing occurring in the support structure.

Referring to FIGS. 3B and 3C, in an etching process for forming a line trench L_TC in which the line support structure L_SP is to be formed and a central trench C_TC in which the central support structure C_SP is to be formed, over-etching occurs in a region in which the line trench L_TC and the central trench C_TC overlap with each other, and therefore, bowing BW may occur. For example, line trench L_TC and the central trench C_TC may be formed by performing an anisotropic dry etching process.

The anisotropic dry etching process may be performed using the following principle.

The anisotropic dry etching process may be performed using a Reactive Ion Etching (RIE) method or a method obtained by applying the RIE method. Plasma is used in the etching process using the RIE method or the method obtained by applying the RIE method. Positive ions generated by the plasma move in a direction perpendicular to a substrate and then collide with an etching target layer, and therefore, the binding force of a surface of the etching target layer may become weak. Molecules at a portion at which the binding force becomes weak in the etching target layer may be discharged together with radicals. As such, because the positive ions are moved in the direction perpendicular to the etching target layer, an etch rate of a surface parallel to the substrate is higher than an etch rate of a surface perpendicular to the substrate. For this reason, the line trench L_TC and the central trench C_TC may be formed in the direction perpendicular to the substrate.

However, a direction in which the positive ions are moved may be changed as the depth of the line trench L_TC and the central trench C_TC becomes deeper. For example, an area of a portion 31 at which the line trench L_TC and the central trench C_TC overlap with each other is wider than an area of another region, and therefore, isotropic etching may be performed in a region having an area wider than the area of the other region. A portion of side surfaces of the line trench L_TC and the central trench C_TC may be over-etched at the portion 31 at which the line trench L_TC and the central trench C_TC vertically overlap with each other, and a shape in which a side surface becomes convex due to the over-etching may be referred to as bowing BW. Therefore, due to bowing BW, a side surface of the portion 31 at which the line trench L_TC and the central trench C_TC overlap with each other may become close to a side surface of a contact hole CTH in which the first support structure 1SP is to be formed. When over-etching occurs, a portion of the line trench L_TC and the central trench C_TC and a side surface of the contact hole CTH may be in contact with each other.

For example, when bowing BW occurs in an etching process for forming the line trench L_TC, the central trench C_TC, and the contact hole CTH in a stack structure STK in which insulating layers IL and gate lines GL are alternately stacked, the central trench C_TC and a portion of the contact hole CTH may be in contact with each other. When the central support structure C_SP and the first support structure 1SP are formed as an insulating material is filled in the central trench C_TC and the contact hole CTH after the etching process, some of the gate lines GL which are to extend between the central support structure C_SP and the first support structure 1SP may be cut, which may result in a defect of the memory device.

Accordingly, a layout capable of suppressing occurrence of bowing BW between the first support structure 1SP and the central support structure C_SP is disclosed in the following embodiment.

Figure 4A:
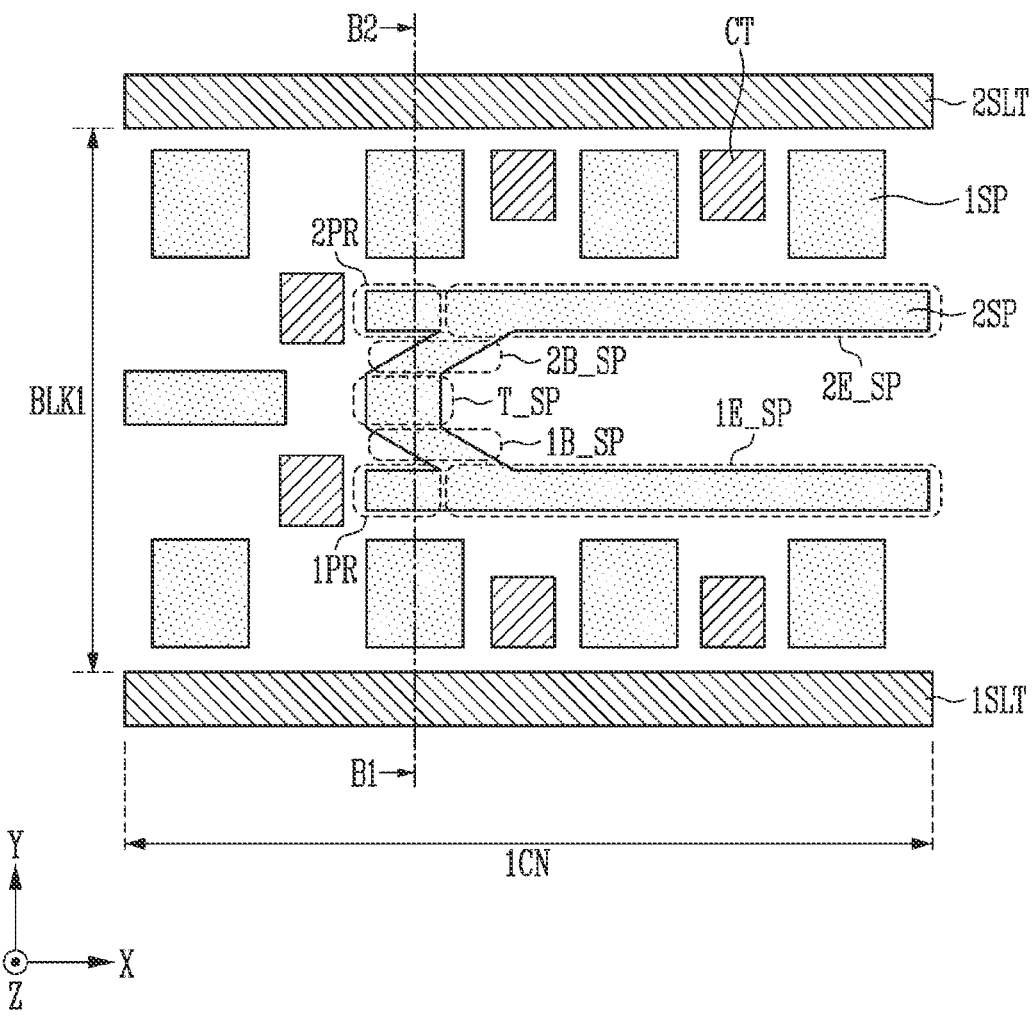
FIG. 4A is a layout of a support structure in accordance with a first embodiment of the present disclosure.
Figure 4B:
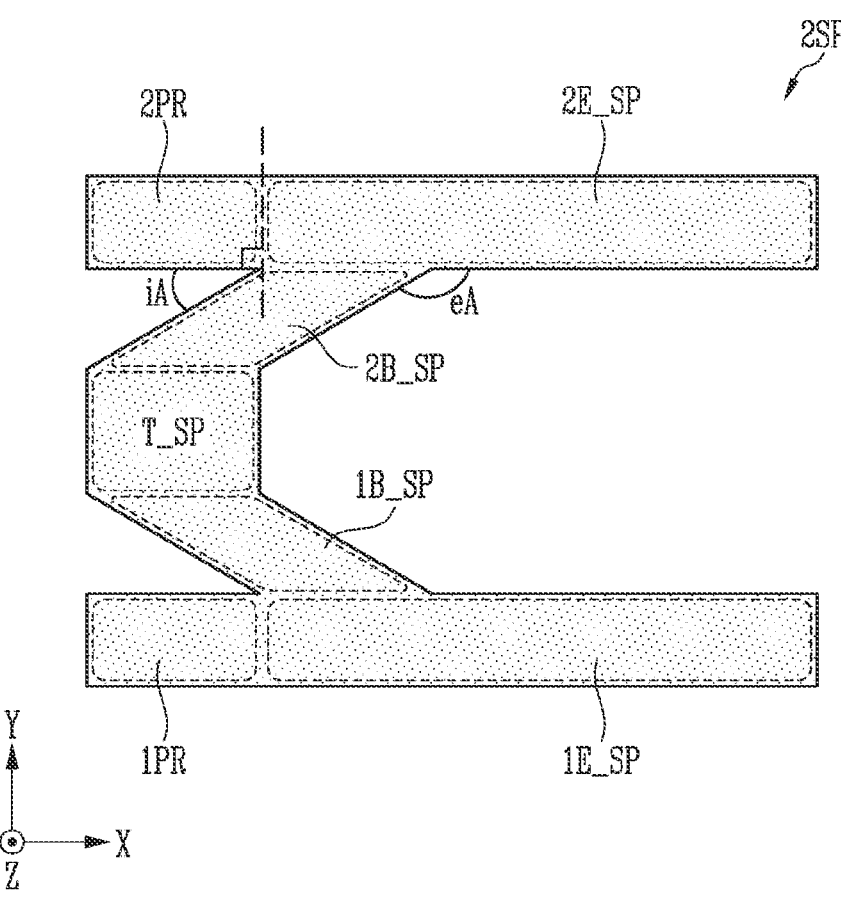
FIG. 4B is a view illustrating a structure of the support structure in accordance with the first embodiment of the present disclosure.
Figure 4C:
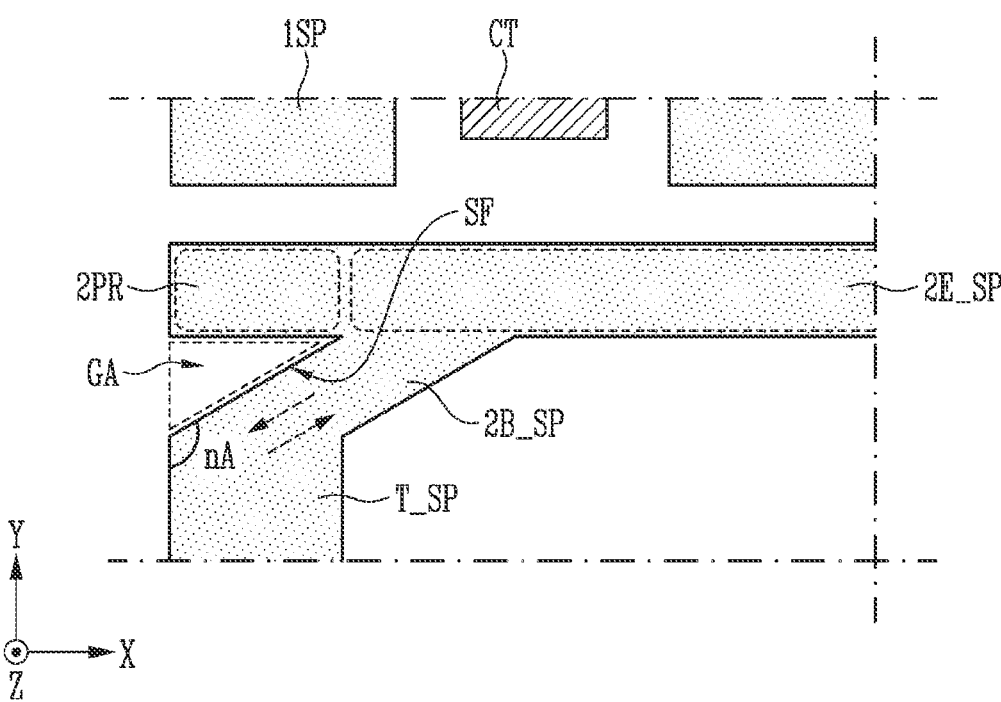
FIG. 4C is a view illustrating an effect in accordance with the first embodiment of the present disclosure.
Figure 4D:
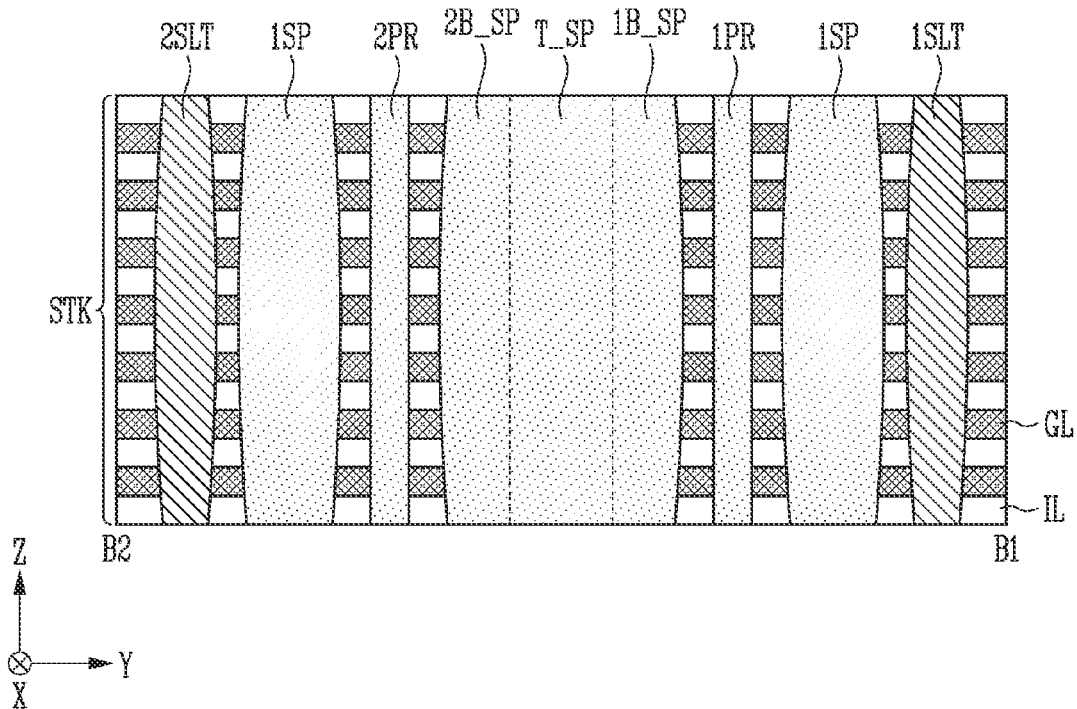
FIG. 4D is a sectional view of the support structure in accordance with the first embodiment of the present disclosure.

FIG. 4A is a layout of a support structure in accordance with a first embodiment of the present disclosure. FIG. 4B is a view illustrating a structure of the support structure in accordance with the first embodiment of the present disclosure. FIG. 4C is a view illustrating an effect in accordance with the first embodiment of the present disclosure. FIG. 4D is a sectional view of the support structure in accordance with the first embodiment of the present disclosure.

Referring to FIGS. 4A and 4B, a layout may be configured such that an end portion of a second support structure 2SP has an M shape. For example, the second support structure 2SP may include first and second outer support structures 1E_SP and 2E_SP, first and second protrusion patterns 1PR and 2PR, a connection support structure T_SP, and first and second oblique support structures 1B_SP and 2B_SP.

The first and second outer support structures 1E_SP and 2E_SP may extend along the X direction and be arranged in parallel to each other. The first and second protrusion patterns 1PR and 2PR may be respectively in contact with the first and second outer support structures 1E_SP and 2E_SP, and be arranged in parallel to each other. For example, the first protrusion pattern 1PR may be in contact with the first outer support structure 1E_SP along the X direction, and the second protrusion pattern 2PR may be in contact with the second outer support structure 2E_SP along the X direction.

The connection support structure T_SP may be located between the first and second protrusion patterns 1PR and 2PR, and be spaced apart from the first and second protrusion patterns 1PR and 2PR.

The first and second oblique support structures 1B_SP and 2B_SP may connect the first and second outer support structures 1E_SP and 2E_SP and the connection support structure T_SP to each other in oblique directions. For example, the first oblique support structure 1B_SP may connect the first outer support structure 1E_SP and the connection support structure T_SP to each other in an oblique direction, and the second oblique support structure 2B_SP may connect the second outer support structure 2E_SP and the connection support structure T_SP to each other in an oblique direction.

An interior angle iA formed by the second oblique support structure 2B_SP and the second protrusion pattern 2PR may be smaller than 90 degrees, and an exterior angle eA formed by the second oblique support structure 2B_SP and the second outer support structure 2E_SP may be greater than 90 degrees. For example, a sum of the interior angle iA and the exterior angle eA may be 180 degrees.

Referring to FIGS. 4B and 4C, the connection support structure T_SP and the second outer support structure 2E_SP are not vertically in contact with each other but are in contact with each other in an oblique direction by the second oblique support structure 2B_SP, so that occurrence of bowing in an etching process for forming trenches can be reduced.

For example, an etching process for forming trenches in regions in which the first and second outer support structures 1E_SP and 2E_SP, the first and second protrusion patterns 1PR and 2PR, the connection support structure T_SP, and the first and second oblique support structures 1B_SP and 2B_SP are to be formed may be performed as an anisotropic dry etching process. In the case of the anisotropic dry etching process, positive ions are moved in a vertical direction Z as described with reference to FIG. 3B. When the connection support structure T_SP and the second outer support structure 2E_SP are connected to each other in an oblique direction by the second oblique support structure 2B_SP as shown in FIG. 4C, the direction in which the positive ions are moved may be changed along the direction of the second oblique support structure 2B_SP. That is, although the moving path of the positive ions moved in the vertical direction Z is changed to the oblique direction as the direction of the second oblique support structure 2B_SP, an angle nA at which the positive ions collide with a side surface SF of a trench corresponding to the second oblique support structure 2B_SP is greater than 90 degrees. Hence, over-etching might not occur at the side surface SF of the trench corresponding to the second oblique support structure 2B_SP, or the size of bowing may be limited even when the over-etching occurs.

Referring to FIGS. 4C and 4D, a gap GA having a triangular or wedge shape is located between the side surface SF of the trench corresponding to the second oblique support structure 2B_SP and a trench corresponding to the second protrusion pattern 2PR. Therefore, although bowing occurs at the side surface SF of the trench corresponding to the second oblique support structure 2B_SP, the bowing has influence on only the area of the gap GA, and has no influence on a layout in which a first support structure 1SP and the second protrusion pattern 2PR are spaced apart from each other. Also, although bowing occurs at the side surface SF of the trench corresponding to the second oblique support structure 2B_SP, a trench corresponding to the second protrusion pattern 2PR is formed between a trench in which the first support structure 1SP is to be formed and a region in which the second oblique support structure 2B_SP is to be formed. Therefore, the trench corresponding to the second protrusion pattern 2PR may perform a blocking function.

Thus, although support structures are formed by filling the trenches with an insulating material after the etching process, first support structures 1SP and the first or second protrusion pattern 1PR or 2PR are not in contact with each other.

Figure 5:
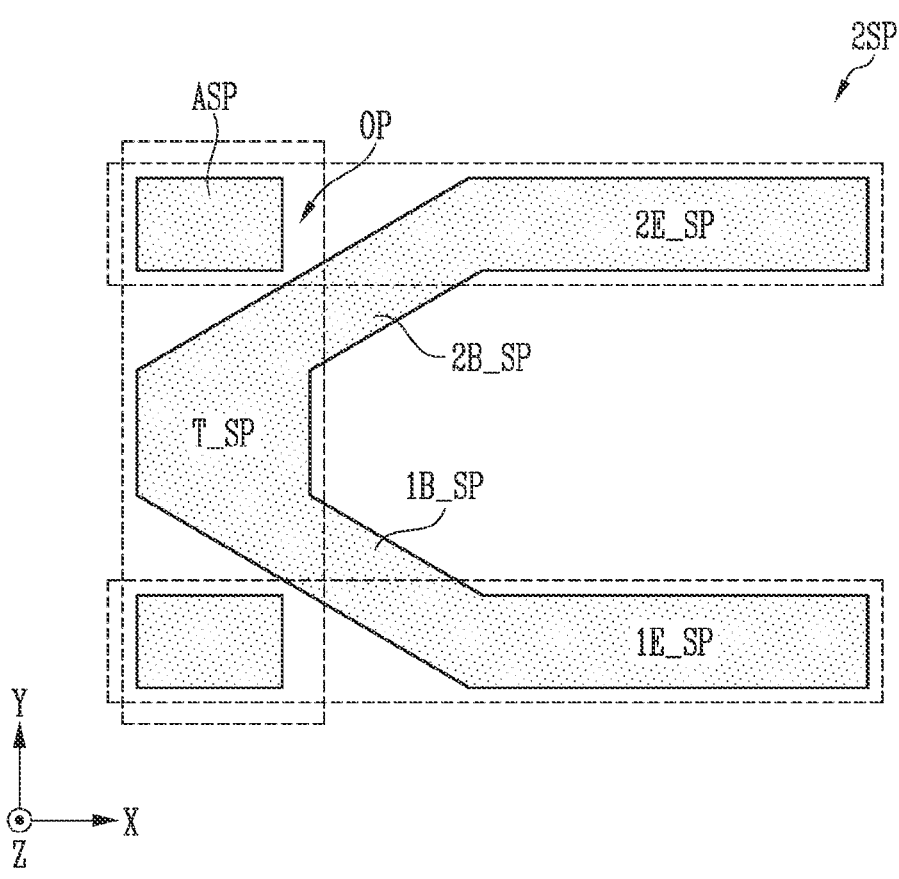
FIG. 5 is a view illustrating a support structure in accordance with a second embodiment of the present disclosure.

FIG. 5 is a view illustrating a support structure in accordance with a second embodiment of the present disclosure.

Referring to FIG. 5, the second support structure 2SP in accordance with the second embodiment of the present disclosure does not include the first and second protrusion patterns (1PR and 2PR, which are shown in FIG. 4B) included in the first embodiment, but may include auxiliary support structures ASP spaced apart from the first and second outer support structures 1E_SP and 2E_SP. The auxiliary support structures ASP may be spaced apart from the first and second outer support structures 1E_SP and 2E_SP, the first and second oblique support structures 1B_SP and 2B_SP, and the connection support structure T_SP. For example, the auxiliary support structures ASP may be located in a region OP in which a region extending in the Y direction from the connection support structure T_SP and a region extending in the X direction from the first and second outer support structures 1E_SP and 2E_SP overlap with each other. The auxiliary support structures ASP in accordance with the second embodiment of the present disclosure may have a quadrangular island structure. A layout of the connection support structure T_SP and the first and second outer support structures 1E_SP and 2E_SP except the auxiliary support structures ASP may be identical to the layout of the connection support structure T_SP and the first and second outer support structures 1E_SP and 2E_SP, described in the first embodiment.

Figure 6:
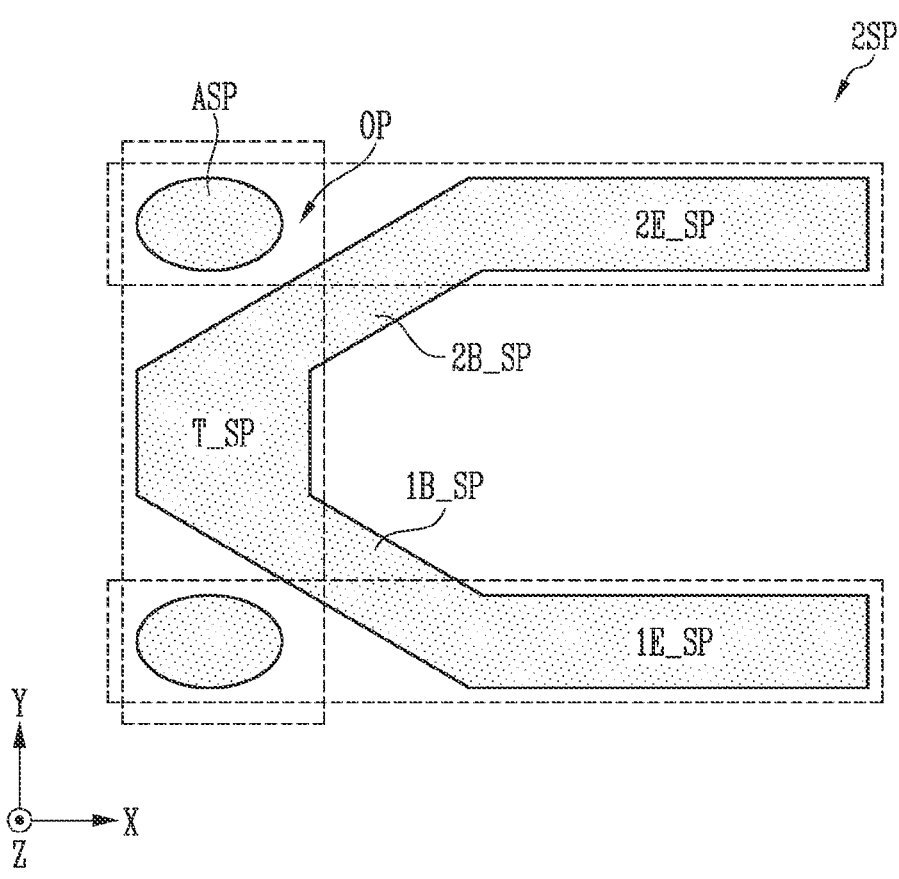
FIG. 6 is a view illustrating a support structure in accordance with a third embodiment of the present disclosure.

FIG. 6 is a view illustrating a support structure in accordance with a third embodiment of the present disclosure.

Referring to FIG. 6, the second support structure 2SP in accordance with the third embodiment of the present disclosure does not include the first and second protrusion patterns (1PR and 2PR, which are shown in FIG. 4) included in the first embodiment, but may include auxiliary support structures ASP spaced apart from the first and second outer support structures 1E_SP and 2E_SP. The auxiliary support structures ASP may be spaced apart from the first and second outer support structures 1E_SP and 2E_SP, the first and second oblique support structures 1B_SP and 2B_SP, and the connection support structure T_SP. For example, the auxiliary support structures ASP may be located in a region OP in which a region extending in the Y direction from the connection support structure T_SP and a region extending in the X direction from the first and second outer support structures 1E_SP and 2E_SP overlap with each other. The auxiliary support structures ASP in accordance with the third embodiment of the present disclosure may have a circular or elliptical island structure. A layout of the connection support structure T_SP and the first and second outer support structures 1E_SP and 2E_SP except the auxiliary support structures ASP may be identical to the layout of the connection support structure T_SP and the first and second outer support structures 1E_SP and 2E_SP, described in the first embodiment.

Figure 7:
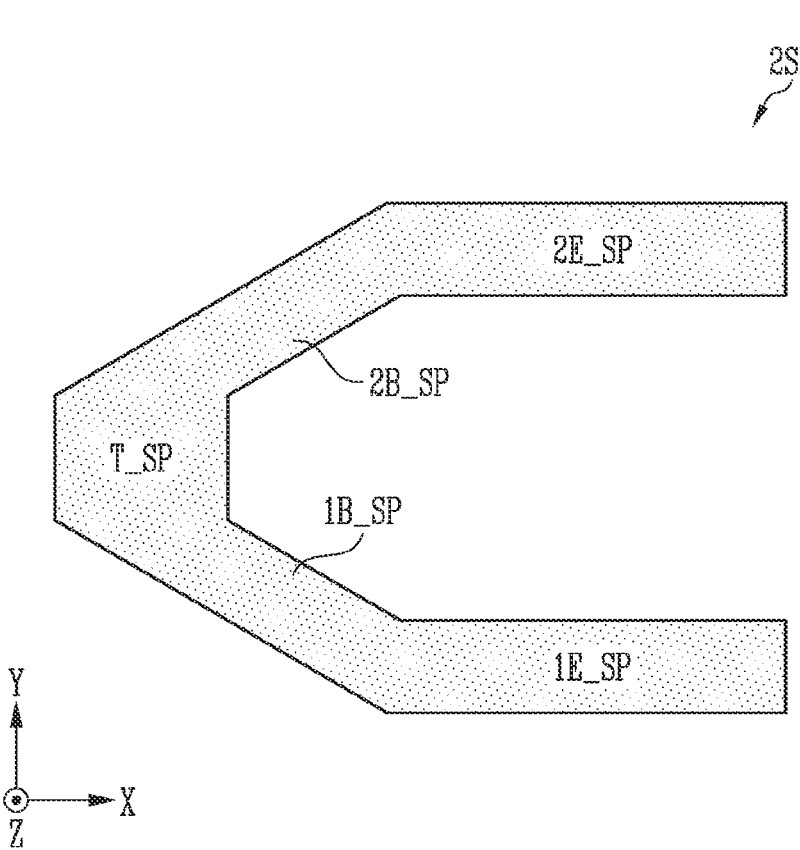
FIG. 7 is a view illustrating a support structure in accordance with a fourth embodiment of the present disclosure.

FIG. 7 is a view illustrating a support structure in accordance with a fourth embodiment of the present disclosure.

Referring to FIG. 7, the second support structure 2SP in accordance with the fourth embodiment of the present disclosure might not include the first and second protrusion patterns (1PR and 2PR, which are shown in FIG. 4B) extending from the first and second outer support structures 1E_SP and 2E_SP or the auxiliary support structures (ASP shown in FIG. 5 or 6). In a layout in accordance with the fourth embodiment of the present disclosure, the connection support structure T_SP and the first and second outer support structures 1E_SP and 2E_SP of the second support structure 2SP may have the same layout as the connection support structure T_SP and the first and second outer support structures 1E_SP and 2E_SP of the third embodiment.

Figure 8:
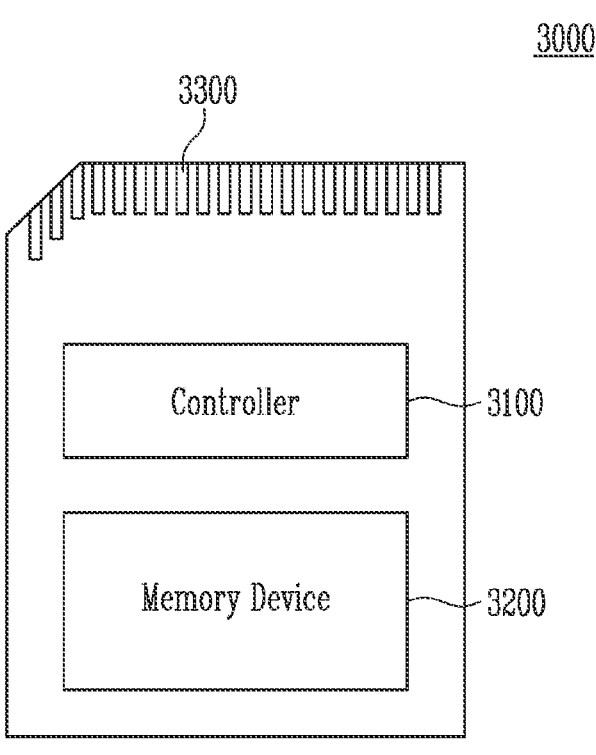
FIG. 8 is a diagram illustrating a memory card system to which the memory device of the present disclosure is applied.

FIG. 8 is a diagram illustrating a memory card system to which a memory device of the present disclosure is applied.

Referring to FIG. 8, a memory card system 3000 includes a controller 3100, a memory device 3200, and a connector 3300.

The controller 3100 may be connected to the memory device 3200. The controller 3100 may access the memory device 3200. For example, the controller 3100 may control a program, read, or ease operation, or control a background operation of the memory device 3200. The controller 3100 may provide an interface between the memory device 3200 and a host. The controller 3100 may drive firmware for controlling the memory device 3200. For example, the controller 3100 may include components such as Random-Access Memory (RAM), a processing unit, a host interface, a memory interface, and an error corrector.

The controller 3100 may communicate with an external device through the connector 3300. The controller 3100 may communicate with the external device (e.g., the host) according to a specific communication protocol. Exemplarily, the controller 3100 may communicate with the external device through at least one of various communication protocols such as a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), firewire, a Universal Flash Storage (UFS), Wi-Fi, Bluetooth, and NVMe. Exemplarily, the connector 3300 may be defined by at least one of the above-described various communication protocols.

The memory device 3200 may include memory cells, and be configured identically to the memory device 100 shown in FIG. 1.

The controller 3100 and the memory device 3200 may be integrated into a single semiconductor device, to constitute a memory card. For example, the controller 3100 and the memory device 3200 may constitute a memory card such as a personal computer (PC) card (Personal Computer Memory Card International Association (PCMCIA)), a Compact Flash (CF) card, a Smart Media Card (SM and SMC), a memory stick, a Multi-Media Card (MMC, RS-MMC, MMCmicro and eMMC), an SD card (SD, miniSD, microSD and SDHC), and a Universal Flash Storage (UFS).

Figure 9:
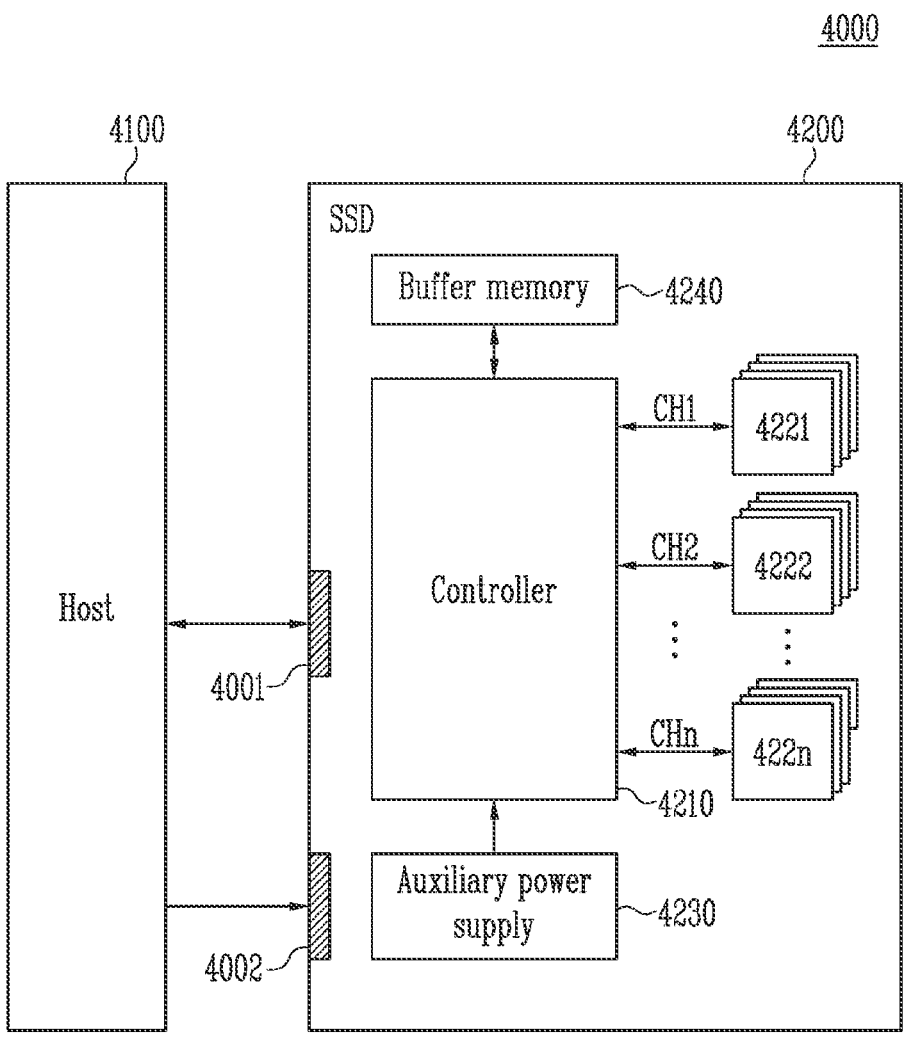
FIG. 9 is a diagram illustrating a Solid-State Drive (SSD) system to which the memory device of the present disclosure is applied.

FIG. 9 is a diagram illustrating a Solid-State Drive (SSD) system to which a memory device of the present disclosure is applied.

Referring to FIG. 9, an SSD system 4000 includes a host 4100 and an SSD 4200. The SSD 4200 exchanges signals with the host 4100 through a signal connector 4001, and receives power through a power connector 4002. The SSD 4200 includes a controller 4210, a plurality of memory devices 4221 to 422n, an auxiliary power supply 4230, and buffer memory 4240.

The controller 4210 may control the plurality of memory devices 4221 to 422n in response to a signal received from the host 4100. Exemplarily, the signal may be a signal based on an interface between the host 4100 and the SSD 4200. For example, the signal may be a signal defined by at least one of interfaces such as a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), a firewire, a Universal Flash Storage (UFS), a WI-FI, a Bluetooth, and an NVMe.

The plurality of memory devices 4221 to 422n may include a plurality of memory cells configured to store data. Each of the plurality of memory devices 4221 to 422n may be configured identically to the memory device 100 shown in FIG. 1. The plurality of memory devices 4221 to 422n may communicate with the controller 4210 through channels CH1 to CHn.

The auxiliary power supply 4230 may be connected to the host 4100 through the power connector 4002. The auxiliary power supply 4230 may receive power PWR input from the host 4100 and charge the power PWR. When the supply of power from the host 4100 is not smooth, the auxiliary power supply 4230 may provide power of the SSD 4200. Exemplarily, the auxiliary power supply 4230 may be located in the SSD 4200, or be located at the outside of the SSD 4200. For example, the auxiliary power supply 4230 may be located on a main board, and provide auxiliary power to the SSD 4200.

The buffer memory 4240 may operate as buffer memory of the SSD 4200. For example, the buffer memory 4240 may temporarily store data received from the host 4100 or data received from the plurality of memory devices 4221 to 422n, or temporarily store meta data (e.g., a mapping table) of the memory devices 4221 to 422n. The buffer memory 4240 may include volatile memory such as DRAM, SDRAM, DDR SDRAM, LPDDR SDRAM, and GRAM or nonvolatile memory such as FRAM, ReRAM, STT-MRAM, and PRAM.

In accordance with the present disclosure, the layout of support structures is changed, so that a defect which may occur in a manufacturing process of the memory device can be reduced. Accordingly, the yield of the manufacturing process of the memory device can be improved.

While the present disclosure has been shown and described with reference to certain embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described embodiments but should be determined by not only the appended claims but also the equivalents thereof.

In the above-described embodiments, all steps may be selectively performed or some of the steps may be omitted. In each embodiment, the steps are not necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made on the basis of the technological scope of the present disclosure.

Meanwhile, various embodiments of the present disclosure have been described in the drawings and specification. Although specific terminologies are used here, those are only to explain the presented embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein.

What is claimed is:

1. A memory device comprising:
   a first outer support structure extending along a first direction;
   a first protrusion pattern extending along the first direction, the first protrusion pattern being in contact with an end of the first outer support structure;
   a connection support structure spaced apart from the first protrusion pattern along a second direction perpendicular to the first direction; and
   a first oblique support structure connecting the connection support structure and the first outer support structure to each other in a first oblique direction to the first and second directions.

2. The memory device of claim 1, wherein the memory device further comprises a gap having a triangular shape located between the first protrusion pattern, on one side, and the connection support structure and the first oblique support structure, on another side.

3. The memory device of claim 1, wherein an interior angle formed by the first protrusion pattern and the first oblique support structure is less than 90 degrees.

4. The memory device of claim 1, wherein an exterior angle formed by the first outer support structure and the first oblique support structure is greater than 90 degrees.

5. The memory device of claim 1, wherein a sum of an interior angle formed by the first protrusion pattern and the first oblique support structure and an exterior angle formed by the first outer support structure and the first oblique support structure is 180 degrees.

6. The memory device of claim 1, wherein the first outer support structure, the first protrusion pattern, the connection support structure, and the first oblique support structure penetrate, toward a substrate, a stack structure located on the substrate.

7. The memory device of claim 1, further comprising:
a second outer support structure arranged in parallel to the first outer support structure;
a second protrusion pattern parallel to the first protrusion pattern, the second protrusion pattern being in contact with an end of the second outer support structure; and
a second oblique support structure connecting the connection support structure and the second outer support structure to each other in a second oblique direction to the first and second directions.

8. The memory device of claim 7, wherein the connection support structure is located between the first and second protrusion patterns.

9. The memory device of claim 7, wherein the first and second oblique support structures are symmetrical to each other with respect to the connection support structure.

10. A memory device comprising:
a first outer support structure extending in a first direction;
a connection support structure spaced apart from the first outer support structure along a second direction perpendicular to the first direction;
a first oblique support structure connecting the connection support structure and the first outer support structure to each other in a first oblique direction to the first and second directions; and a first auxiliary support structure located in a region in which the first direction along the first outer support structure and the second direction along the connection support structure extend to intersect with each other, the first auxiliary support structure being spaced apart from the first outer support structure, the connection support structure, and the first oblique support structure.

11. The memory device of claim 10, wherein the first outer support structure, the connection support structure, the first oblique support structure, and the first auxiliary support structure penetrate, toward a substrate, a stack structure located on the substrate.

12. The memory device of claim 10, wherein the first auxiliary support structure has a quadrangular, circular, or elliptical island shape.

13. The memory device of claim 10, further comprising:
a second outer support structure arranged in parallel to the first outer support structure;
a second oblique support structure connecting the connection support structure and the second outer support structure to each other in a second oblique direction to the first and second directions; and
a second auxiliary support structure located in a region in which the first direction along the second outer support structure and the second direction along the connection support structure extend to intersect with each other, the second auxiliary support structure being spaced apart from the second outer support structure, the connection support structure, and the second oblique support structure.

14. The memory device of claim 13, wherein the connection support structure is located between the first and second auxiliary support structures.

15. The memory device of claim 13, wherein the first and second oblique support structures are symmetrical to each other with respect to the connection support structure.

* * * * *